United States Patent
Ching et al.

(10) Patent No.: US 12,504,106 B1
(45) Date of Patent: Dec. 23, 2025

(54) LOW CLEARANCE FLUID COUPLING

(71) Applicant: GOODRICH CORPORATION, Charlotte, NC (US)

(72) Inventors: Nathaniel Ching, Hartville, OH (US); Jin Hu, Cary, NC (US); Casey M Slane, Tallmadge, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/752,421

(22) Filed: Jun. 24, 2024

(51) Int. Cl.
*F16L 37/084* (2006.01)
*F16L 37/091* (2006.01)

(52) U.S. Cl.
CPC .................................. *F16L 37/091* (2013.01)

(58) Field of Classification Search
CPC ......... F16L 37/091; F16L 17/00; F16L 17/02; F16L 17/06; F16L 21/03; F16L 21/035; F16L 27/1017; F16L 27/08; F16L 27/0804; F16L 27/0808; F16L 27/12; F16L 27/125; F16L 39/04; F16L 47/041; F16L 47/18; F16L 47/065; F16L 47/08; F16L 19/04; F16L 19/041; F16L 19/043
See application file for complete search history.

(56) References Cited

U.S. PATENT DOCUMENTS

| | | | |
|---|---|---|---|
| 2,748,463 A | * | 6/1956 | Mueller ............... B21D 39/046 29/523 |
| 6,581,981 B2 | | 6/2003 | Cooper |
| 8,226,127 B2 | | 7/2012 | Rippstein |
| 10,648,602 B2 | | 5/2020 | Quesada |
| 11,365,839 B2 | | 6/2022 | Quesada |
| 11,515,065 B2 | | 11/2022 | Taylor et al. |
| 2012/0056416 A1 | * | 3/2012 | Briand .................. F16L 47/065 137/15.01 |
| 2017/0343141 A1 | * | 11/2017 | Roper ................. F16L 27/0804 |

FOREIGN PATENT DOCUMENTS

EP          964198          9/2005

* cited by examiner

*Primary Examiner* — Aaron M Dunwoody
(74) *Attorney, Agent, or Firm* — SNELL & WILMER L.L.P.

(57) ABSTRACT

A low clearance fluid coupling is provided. The low clearance fluid coupling includes a sleeve/fitting body; a tube, a ferrule, and an elastomeric O-ring seal. An end of the tube is configured to be inserted within an end of the sleeve/fitting body. The ferrule is configured to surround an outer circumference of the tube and is further configured to interface with the sleeve/fitting body. The elastomeric O-ring seal configured to prevent or reduce liquid from passing through to the ferrule.

18 Claims, 7 Drawing Sheets

LOW CLEARANCE FLUID COUPLING

FIELD

The present disclosure relates to fittings for fluid systems, and more specifically, to a low clearance fluid coupling.

BACKGROUND

Fixed cavity couplings and variable cavity couplings, such as those utilized in aircrafts, typically allow for movement of a tube relative to the coupling. Typically, such movement is desirable where couplings are expected to take up expansion and contraction of the fluid system due to pressure and temperature changes. However, typically available fixed cavity couplings and variable cavity couplings require a large clearance not only for the fitting itself, but also for installation. Alternatives to such fixed cavity couplings and variable cavity couplings may be axially swaged fittings have low clearance requirement. However, axially swaged fittings are rigid couplings. Additionally, axially swaged fittings are prone to failure if any of the materials exhibit creep or stress relaxation.

SUMMARY

A low clearance fluid coupling is disclosed herein. The low clearance fluid coupling includes a sleeve/fitting body, a tube, a ferrule, and an elastomeric O-ring seal. An end of the tube is configured to be inserted within an end of the sleeve/fitting body. The ferrule is configured to surround an outer circumference of the tube and is further configured to interface with the sleeve/fitting body. The elastomeric O-ring seal configured to prevent or reduce liquid from passing through to the ferrule.

In various embodiments, the tube is comprised of at least one of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP).

In various embodiments, the sleeve/fitting body is comprised of at least one of stainless steel, aluminum, or titanium.

In various embodiments, the ferrule is a snap ferrule and wherein a distal end of the snap ferrule is configured to couple to a proximal end of the sleeve/fitting body.

In various embodiments, the distal end of the snap ferrule comprises at least one of a convex portion or a concave portion. In various embodiments, the proximal end of the sleeve/fitting body comprises an opposite of the at least one of the convex portion or the concave portion. In various embodiments, the convex or concave portion of the distal end of the snap ferrule snaps into the concave or convex portion of the proximal end of the sleeve/fitting body.

In various embodiments, the tube comprises a groove on an outside circumference of the tube in which the elastomeric O-ring seal is positioned.

In various embodiments, the ferrule is fitted into a distal end of the sleeve/fitting body positioned between the tube and the sleeve/fitting body and wherein the sleeve/fitting body is either swaged or crimped to the ferrule.

In various embodiments, the tube comprises a bead that is positioned between a tube end of the tube and the ferrule.

In various embodiments, the sleeve/fitting body comprises a groove on an inside circumference of the sleeve/fitting body in which the elastomeric O-ring seal is positioned.

In various embodiments, the ferrule is positioned between the elastomeric O-ring seal and an end of the sleeve/fitting body. In various embodiments, the end of the sleeve/fitting body is either swaged or crimped to contain the ferrule within the sleeve/fitting body.

Also disclosed herein is an aircraft. The aircraft includes a low clearance fluid coupling includes a sleeve/fitting body, a tube, a ferrule, and an elastomeric O-ring seal. An end of the tube is configured to be inserted within an end of the sleeve/fitting body. The ferrule is configured to surround an outer circumference of the tube and is further configured to interface with the sleeve/fitting body. The elastomeric O-ring seal configured to prevent or reduce liquid from passing through to the ferrule.

In various embodiments, the tube is comprised of at least one of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP).

In various embodiments, the sleeve/fitting body is comprised of at least one of stainless steel, aluminum, or titanium.

In various embodiments, the ferrule is a snap ferrule and wherein a distal end of the snap ferrule is configured to couple to a proximal end of the sleeve/fitting body.

In various embodiments, the distal end of the snap ferrule comprises at least one of a convex portion or a concave portion. In various embodiments, the proximal end of the sleeve/fitting body comprises an opposite of the at least one of the convex portion or the concave portion. In various embodiments, the convex or concave portion of the distal end of the snap ferrule snaps into the concave or convex portion of the proximal end of the sleeve/fitting body.

In various embodiments, the tube comprises a groove on an outside circumference of the tube in which the elastomeric O-ring seal is positioned.

In various embodiments, the ferrule is fitted into a distal end of the sleeve/fitting body positioned between the tube and the sleeve/fitting body and wherein the sleeve/fitting body is either swaged or crimped to the ferrule.

In various embodiments, the tube comprises a bead that is positioned between a tube end of the tube and the ferrule.

In various embodiments, the sleeve/fitting body comprises a groove on an inside circumference of the sleeve/fitting body in which the elastomeric O-ring seal is positioned.

In various embodiments, the ferrule is positioned between the elastomeric O-ring seal and an end of the sleeve/fitting body. In various embodiments, the end of the sleeve/fitting body is either swaged or crimped to contain the ferrule within the sleeve/fitting body.

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
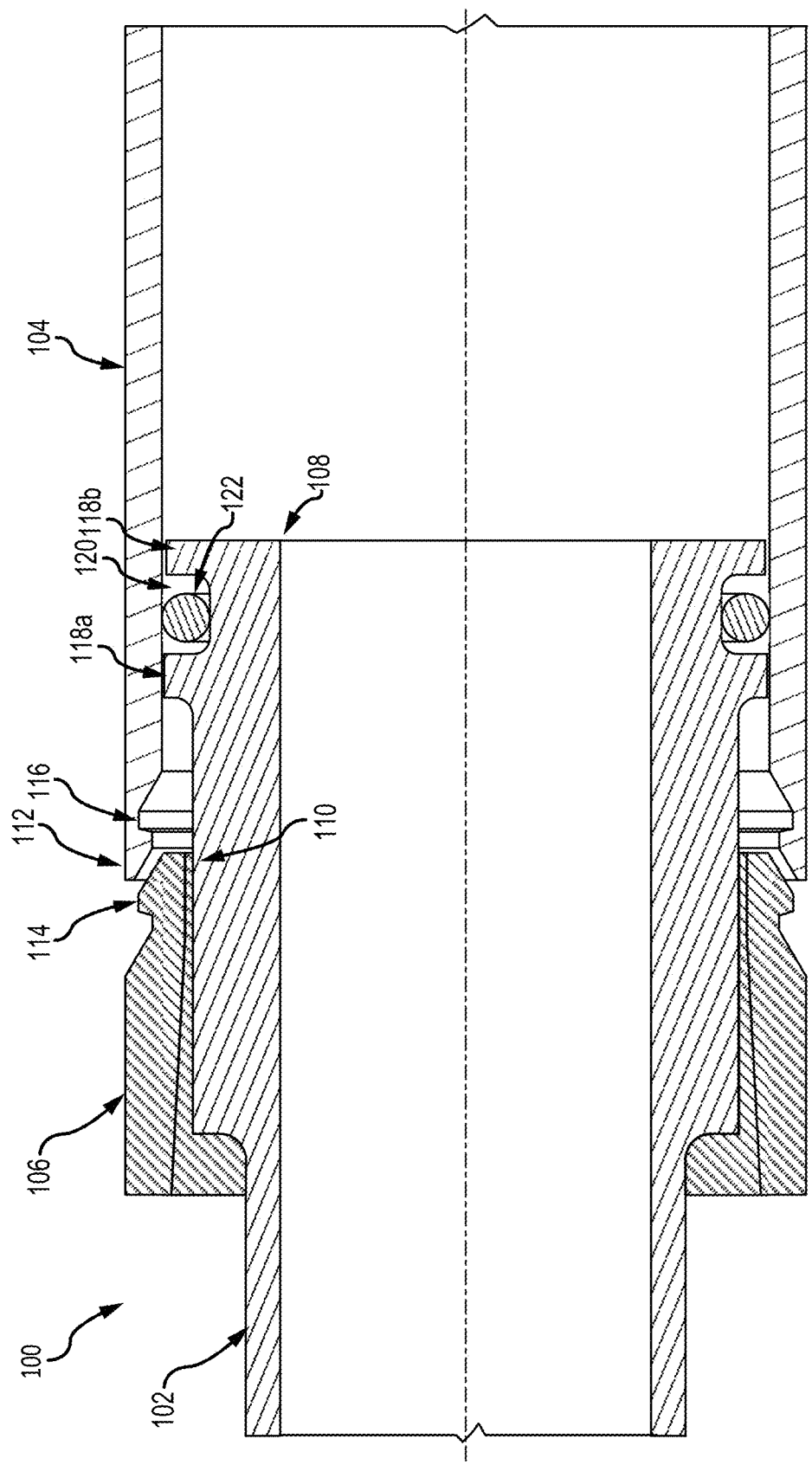
FIGS. 1A and 1B illustrate a cross sectional view and an isometric cross-sectional view of a fixed cavity coupling in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As stated previously, typical fixed cavity couplings and variable cavity couplings, such as those utilized in aircrafts, allow for movement of a tube relative to the coupling. While such movement is desirable where couplings are expected to take up expansion and contraction of the fluid system due to pressure and temperature changes, such fixed cavity couplings and variable cavity couplings require a large clearance not only for the fitting itself, but also for installation or process. Current alternatives to such fixed cavity couplings and variable cavity couplings may be axially swaged fittings have low clearance requirement. However, such axially swaged fittings are rigid couplings and are prone to failure if any of the materials exhibit creep or stress relaxation.

Disclosed herein is a low clearance fluid coupling for use in an aircraft. In various embodiments, the low clearance fluid coupling may be a fixed cavity coupling or a variable cavity coupling. In various embodiments, the fixed cavity coupling utilizes an elastomeric O-ring seal configured between two flanges on a tube end. In various embodiments, the elastomeric O-ring seals against a sleeve, which is either part of a sleeve/fitting body or a separate part to which another tube end seals. In various embodiments, a snap or crimp or other retention mechanism prevents the flanges from disconnecting from the sleeve/fitting body, thereby keeping the coupling assembly from coming apart under pressure. In various embodiments, the variable cavity coupling utilizes an elastomeric O-ring seal that is configured to be held in a coupling body and seal against the outside of the tube. In various embodiments, the tube includes a bead or boss for the coupling body to grip.

Figure 1B:
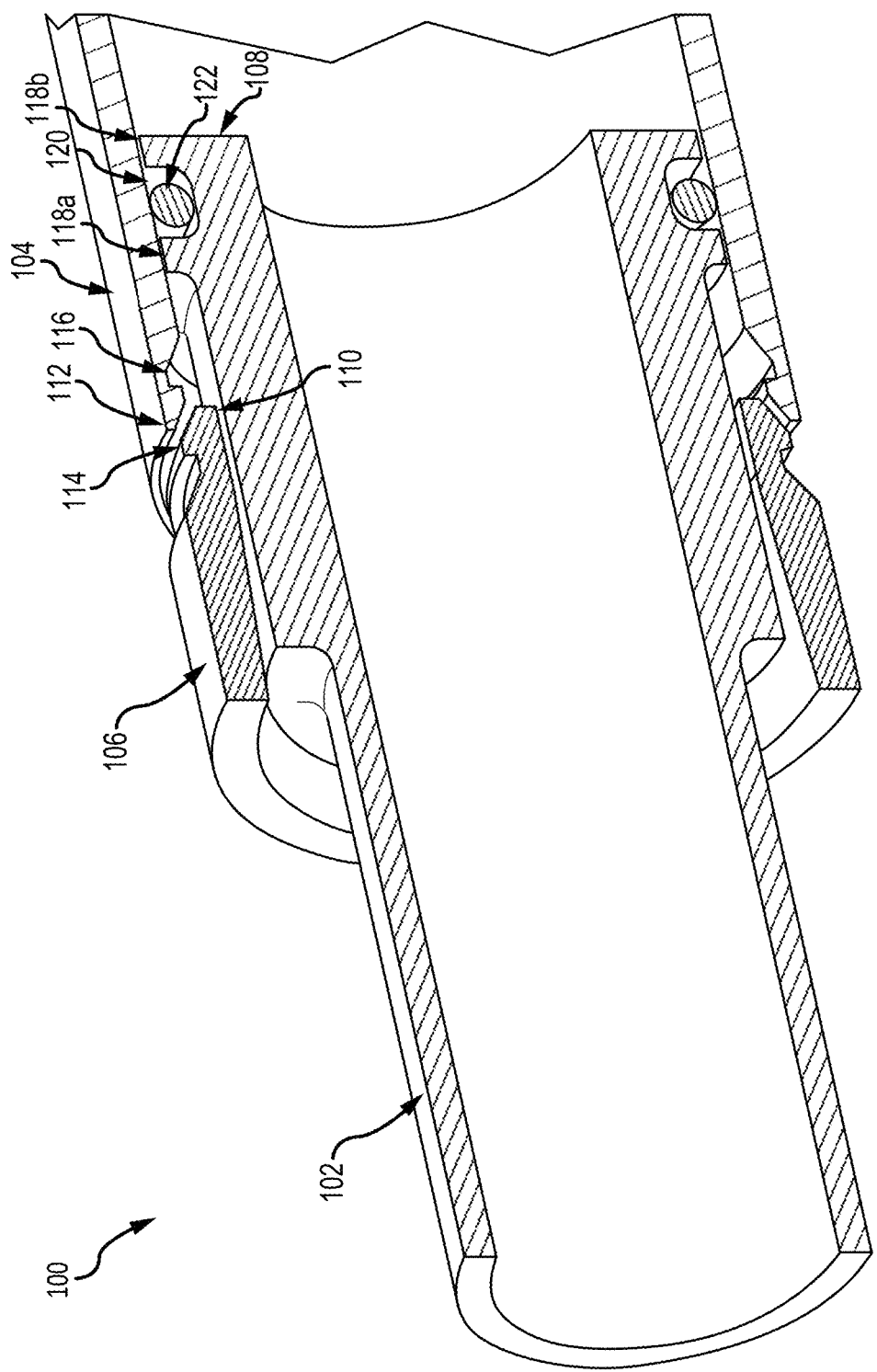

Referring to FIGS. 1A and 1B, in accordance with various embodiments, a cross sectional view and an isometric cross-sectional view of a fixed cavity coupling 100 is illustrated. In various embodiments, the fixed cavity coupling 100 includes a tube 102, a sleeve/fitting body 104, and a snap ferrule 106. In various embodiments, the tube 102 may be comprised of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP), among others. In various embodiments, the sleeve/fitting body 104 and the snap ferrule 106 may be comprised of stainless steel, aluminum, or titanium, among other materials.

In various embodiments, the snap ferrule 106 is configured to be slid around an outer circumference of the tube 102. In various embodiments, a tube end 108 is coupled to or formed on an end of the tube 102. In various embodiments, the snap ferrule 106 and the tube end 108 are designed such that, once the tube end 108 is coupled to or formed on the end of the tube 102, the snap ferrule 106 may slide along the tube 102 but may not be removed from the tube 102. In various embodiments, the tube end 108 is configured to be inserted into the sleeve/fitting body 104. In various embodiments, a distal end 110 of the snap ferrule 106 is configured to be coupled a proximal end 112 of the sleeve/fitting body 104 such that a convex portion 114 of the snap ferrule 106 snaps into a concave portion 116 of the sleeve/fitting body 104, referred to hereafter as an interference fit. In various embodiments, a distal end 110 of the snap ferrule 106 may be concave and the proximal end of the sleeve/fitting body 104 may be convex, without departing with the spirit and scope of the invention. While FIGS. 1A and 1B illustrate on instance of a concave/convex interference fit, multiple different concave/convex geometries may be used to provide additional assurance that the snap ferrule 106 will not come loose from the sleeve/fitting body 104 in service without departing from the spirit and scope of the illustrative embodiments.

In various embodiments, by the distal end 110 of the snap ferrule 106 snapping into the proximal end 112 of the sleeve/fitting body 104, the tube end 108 is contained within the sleeve/fitting body 104, thereby allowing limited movement of the tube end 108 relative to the sleeve/fitting body 104. In various embodiments, the tube end 108 includes two flanges 118a, 118b that form a groove 120 on an outside circumference of the tube end 108 to house an elastomeric O-ring seal 122 configured to prevent or reduce liquid from passing through to the snap ferrule 106 and the sleeve/fitting body 104 coupling. In various embodiments, the sleeve/fitting body 104 and/or the snap ferrule 106 may be coated with lubricant to prevent galling and reduce friction during assembly. In various embodiments, the lubricant may be a solid coating such as epoxy, phenolic, or fluoropolymer, among others. In various embodiments, the lubricant may be a wet coating such as grease or oil from silicone, hydrocarbon, or perfluoropolyether, among others. In various embodiments, the lubricant may be a filled with fluoropolymer, molybdenum disulfide, boron nitride, carbon black, graphite, or other solid lubricants. In various embodiments, the sleeve/fitting body 104 and/or the snap ferrule 106 may also be coated with another metal such as zinc, nickel, silver, or gold, among others. In various embodiments, the sleeve/fitting body 104 and/or the snap ferrule 106 may be coated in an uncured thermoset, anaerobic, or thermoplastic adhesive to aid in retention of the ferrule on the sleeve/fitting body. In various embodiments, the thermoset or anaerobic adhesives may be cured after the ferrule and sleeve/fitting body are assembled. In various embodiments, the sleeve/fitting body 104 and/or the snap ferrule 106 may have grooves or flanges to allow the snap ferrule 106 to be removed from sleeve/fitting body 104 after assembly. In various embodiments, the sleeve/fitting body 104 and/or the snap ferrule 106 may also have slots that allow gripping the sleeve/fitting body 104 and/or the snap ferrule 106 for removal of the snap ferrule 106.

Figure 2A:
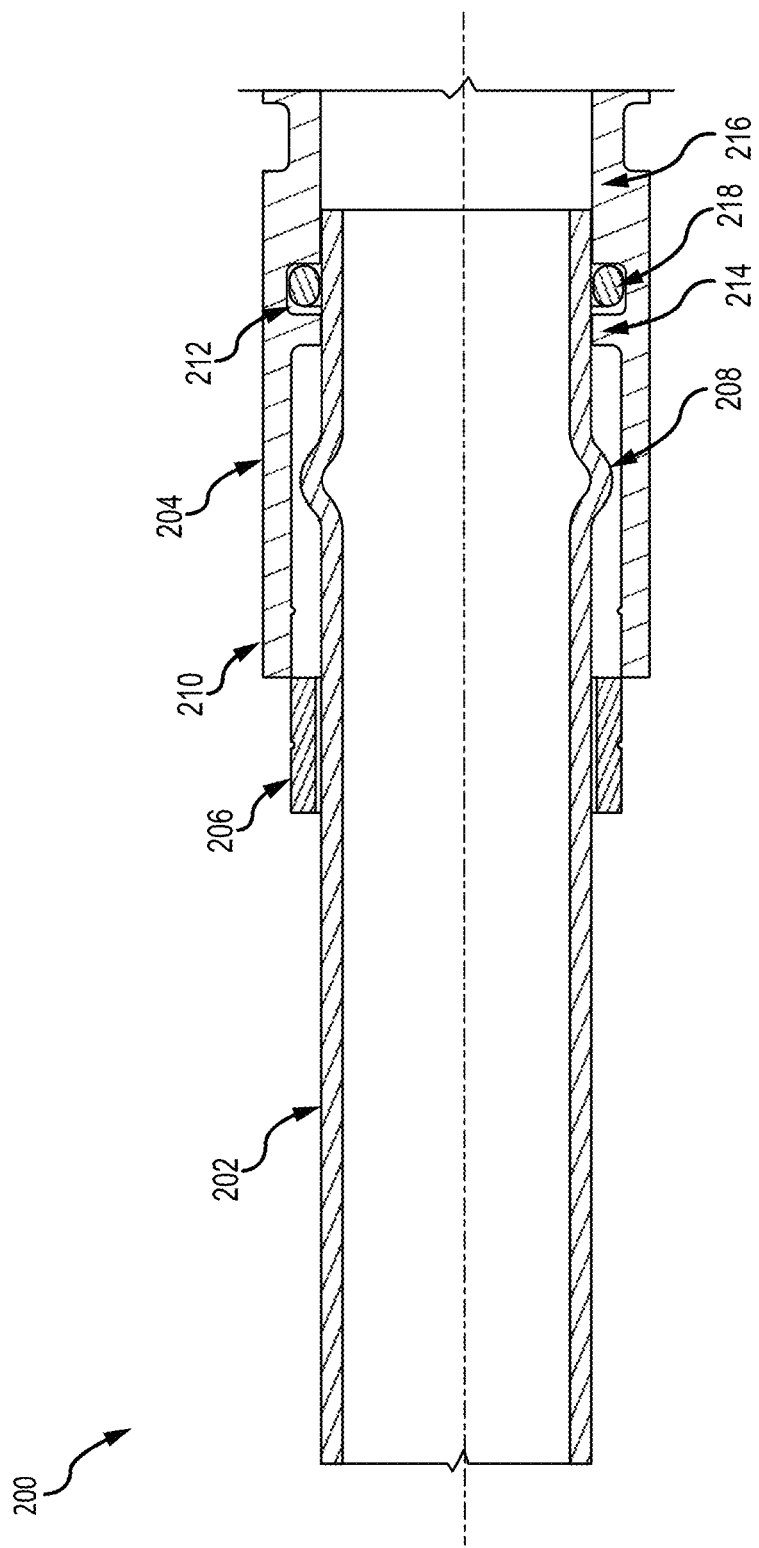
FIGS. 2A, 2B, and 2C illustrate cross sectional views and an isometric cross-sectional view of a variable cavity coupling, in accordance with various embodiments.
Figure 2B:
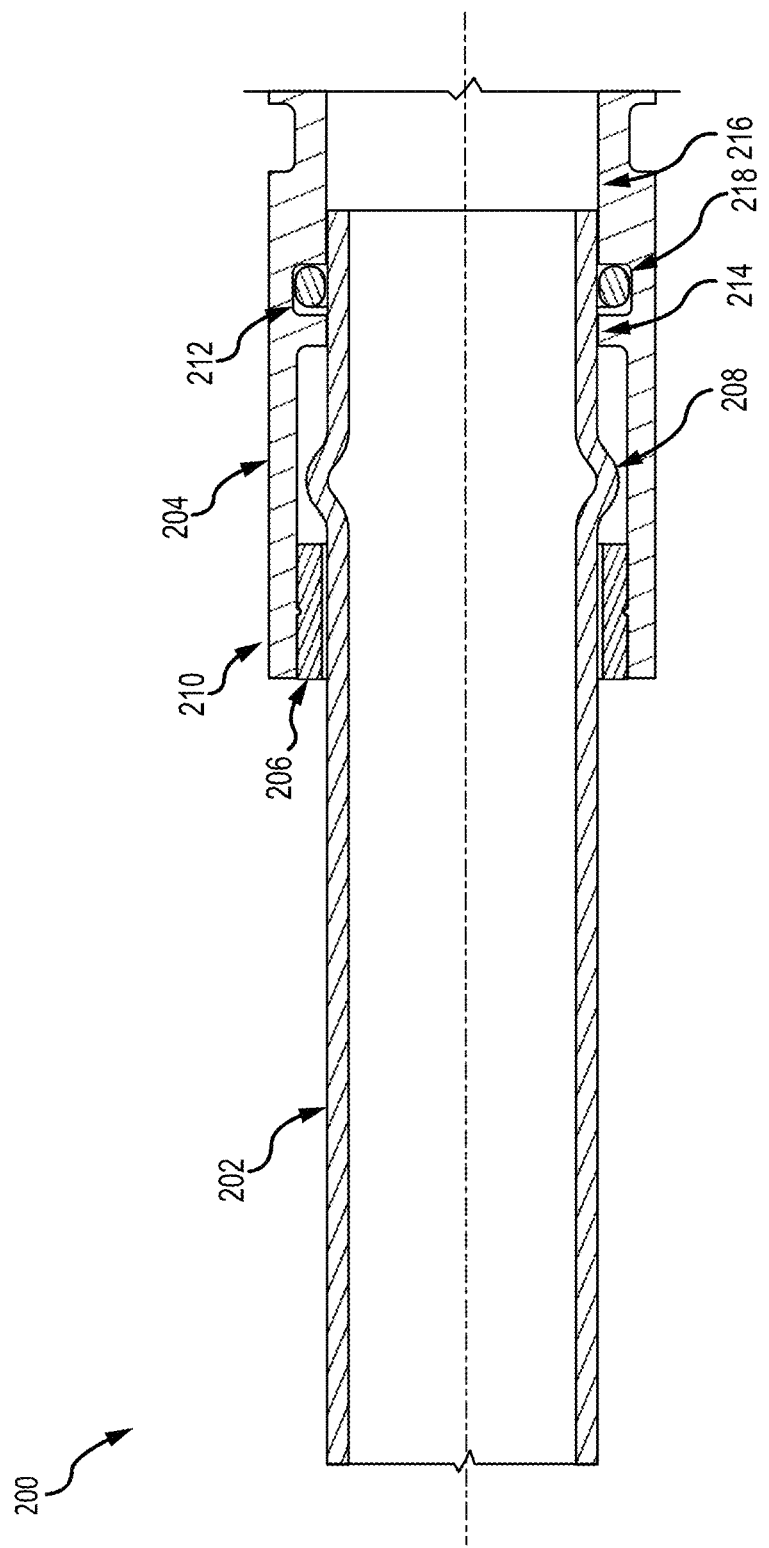
Figure 2C:
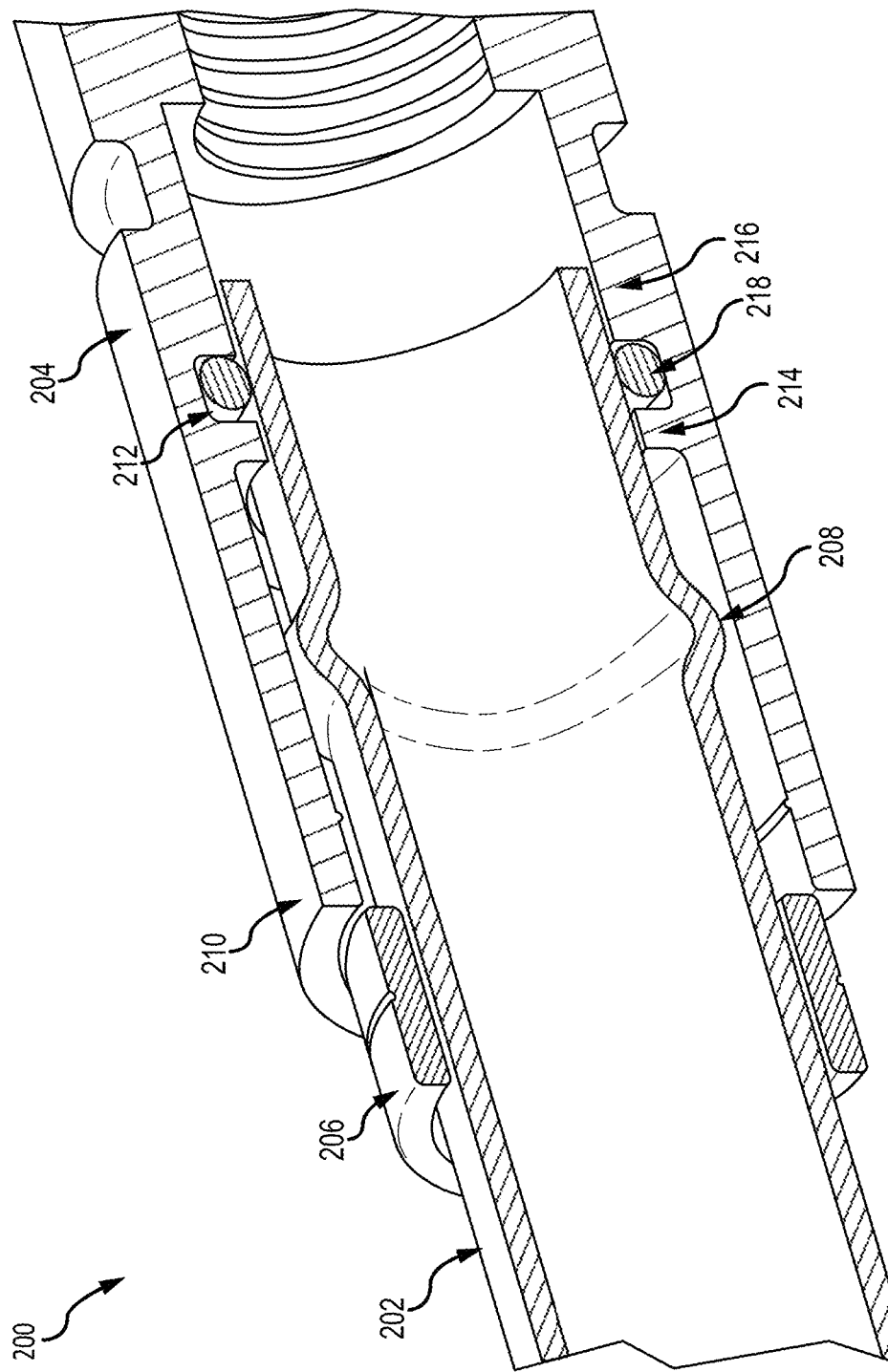

Referring to FIGS. 2A, 2B, and 2C, in accordance with various embodiments, cross sectional views and an isometric cross-sectional view of a variable cavity coupling 200 is illustrated. In various embodiments, the variable cavity coupling 200 includes a tube 202, a sleeve/fitting body 204, and a ferrule 206. In various embodiments, the tube 202 may be comprised of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP), among others. In various embodiments, the sleeve/fitting body 204 and the ferrule 206 may be comprised of stainless steel, aluminum, or titanium, among others.

In various embodiments, the ferrule 206 is configured to be slid around an outer circumference of the tube 202. In various embodiments, a bead 208 is then formed at a location toward an end of the tube 202. In various embodiments, the ferrule 206 and the bead 208 are designed such that, once the bead 208 is formed in the tube 202, the ferrule 206 may slide along the tube 202 but may not be removed from the tube 202. In various embodiments, the tube 202 including the bead 208 is configured to be inserted into the sleeve/fitting body 204. In various embodiments, the ferrule 206 is configured to be slid into a proximal end 210 of the sleeve/fitting body 204. In various embodiments, once the ferrule 206 is slid into the proximal end 210 of the sleeve/fitting body 204, the proximal end 210 of the sleeve/fitting body 204 may be swaged or crimped to the ferrule 206 only an amount to hold the ferrule 206 in the end of the sleeve/fitting body 204. In various embodiments, a swage is where a circular part is uniformly permanently deformed in the radial direction. In various embodiments, a crimp is where certain segments of the cylindrical part are deformed or certain segments are deformed more than other segments. In various embodiments, a swage may typically have higher strength but a crimp may typically be easier to make. In various embodiments, swagging or crimping the ferrule 206 in the end of the sleeve/fitting body 204 allows limited movement of the ferrule 206 and the sleeve/fitting body 204 along a length of the tube 202. In various embodiments, the ferrule 206 may have a groove to swage or crimp so an inside diameter of the ferrule 206 is not distorted after the swaging.

In various embodiments, a groove 212 is formed adjacent to the end of the sleeve/fitting body 204 where the tube 202 including the bead 208 is configured to be inserted. In various embodiments, the groove 212 is bordered by a flange 214 and an internal portion 216 of the sleeve/fitting body 204. In various embodiments, the groove 212 on an inside circumference of the sleeve/fitting body 204 is configured to house an elastomeric O-ring seal 218. In various embodiments, the elastomeric O-ring seal 218 is configured to prevent or reduce liquid from passing through to the proximal end 210 of the sleeve/fitting body 204 and the ferrule 206 coupling. In various embodiments, the sleeve/fitting body 204 may be coated with lubricant to prevent galling and reduce friction during assembly. In various embodiments, the lubricant may be a solid coating such as epoxy, phenolic, or fluoropolymer, among others. In various embodiments, the lubricant may be a wet coating such as grease or oil from silicone, hydrocarbon, or perfluoropolyether, among others. In various embodiments, the lubricant may be a filled with fluoropolymer, molybdenum disulfide, boron nitride, carbon black, graphite, or other solid lubricants. In various embodiments, the sleeve/fitting body 204 may also be coated with another metal such as zinc, nickel, silver, or gold, among others. In various embodiments, the sleeve/fitting body 204 may be coated in an uncured thermoset, anaerobic, or thermoplastic adhesive to aid in retention of the ferrule on the sleeve/fitting body. In various embodiments, the thermoset or anaerobic adhesives may be cured after the ferrule and sleeve/fitting body are assembled.

Figure 3A:
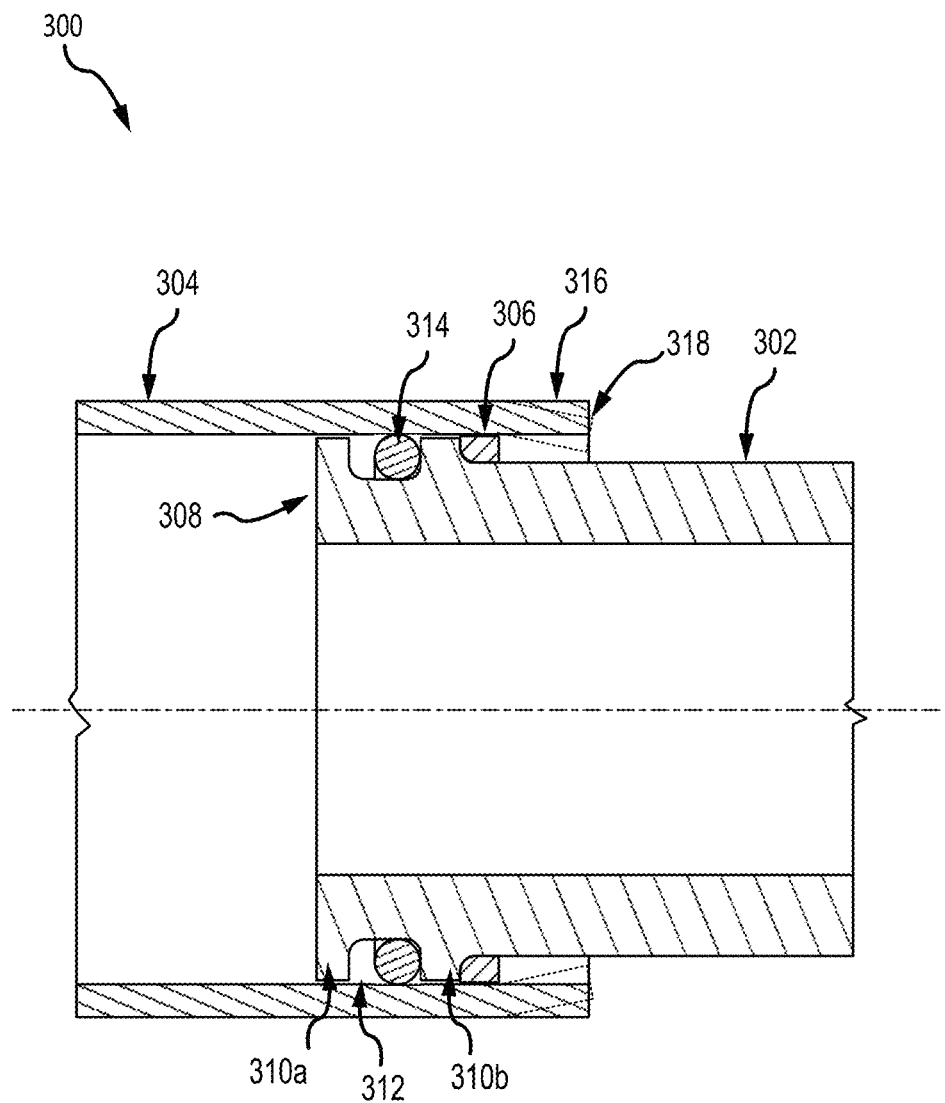
FIGS. 3A and 3B illustrate a cross sectional view and an isometric cross-sectional view of a variable cavity coupling, in accordance with various embodiments.
Figure 3B:
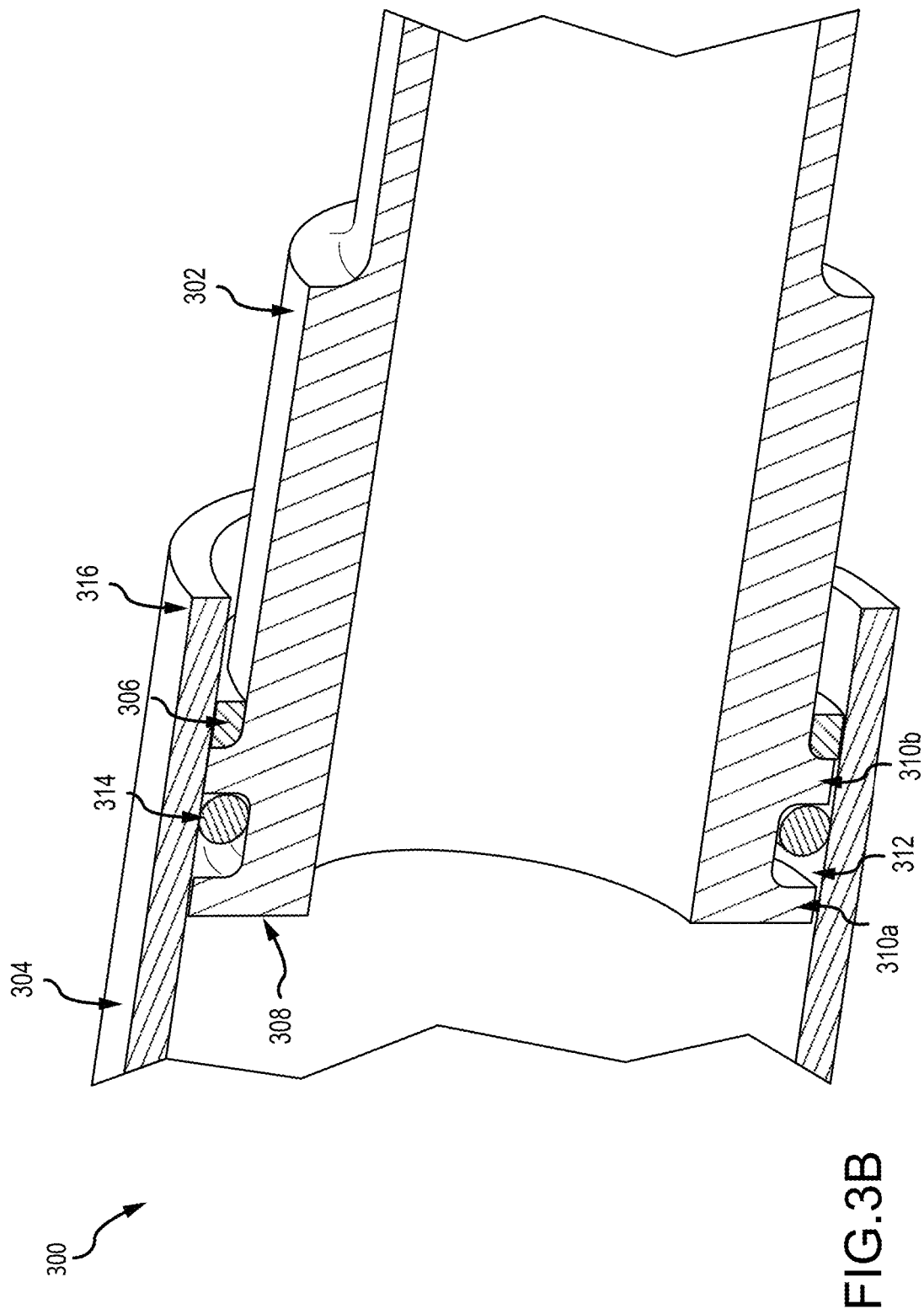

Referring to FIGS. 3A and 3B, in accordance with various embodiments, a cross sectional view and an isometric cross-sectional view of a variable cavity coupling 300 is illustrated. In various embodiments, the variable cavity coupling 300 includes a tube 302, a sleeve/fitting body 304, and a ferrule 306. In various embodiments, the tube 302 may be comprised of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP), among others. In various embodiments, the sleeve/fitting body 304 and the ferrule 306 may be comprised of stainless steel, aluminum, or titanium, among others.

In various embodiments, the ferrule 306 is configured to be slid around an outer circumference of the tube 302. In various embodiments, a tube end 308 is coupled to or formed on an end of the tube 302. In various embodiments, the ferrule 306 and the tube end 308 are designed such that, once the tube end 308 is coupled to or formed on the end of the tube 302, the ferrule 306 may slide along the tube 302 but may not be removed from the tube 302. In various embodiments, the tube end 308 is configured to be inserted into the sleeve/fitting body 304. In various embodiments, the tube end 308 includes two flanges 310a, 310b that form a groove 312 on an outside circumference of the tube end 308 to house an elastomeric O-ring seal 314 configured to prevent or reduce liquid from passing through to the ferrule 306. In various embodiments, once the tube end 308 is inserted into the sleeve/fitting body 304, the ferrule 306 is configured to be slid to an opposite side of the flange 310b. In various embodiments, once the ferrule 306 is slid to an opposite side of the flange 310b, the proximal end 316 of the sleeve/fitting body 304 may be swaged or crimped toward the tube 302 to deform the end of the sleeve/fitting body 304, i.e. deformed end 318. In various embodiments, a swage is where a circular part is uniformly permanently deformed in the radial direction. In various embodiments, a crimp is where certain segments of the cylindrical part are deformed or certain segments are deformed more than other segments. In various embodiments, a swage may typically have higher strength but a crimp may typically be easier to fabricate. In various embodiments, swagging or crimping the sleeve/fitting body 304 allows limited movement of the sleeve/fitting body 304 along a length of the tube 302.

In various embodiments, the sleeve/fitting body 304 may be coated with lubricant to prevent galling and reduce friction during assembly. In various embodiments, the lubricant may be a solid coating such as epoxy, phenolic, or fluoropolymer, among others. In various embodiments, the lubricant may be a wet coating such as grease or oil from silicone, hydrocarbon, or perfluoropolyether, among others. In various embodiments, the lubricant may be a filled with fluoropolymer, molybdenum disulfide, boron nitride, carbon black, graphite, or other solid lubricants. In various embodiments, the sleeve/fitting body 304 may also be coated with another metal such as zinc, nickel, silver, or gold, among others. In various embodiments, the sleeve/fitting body 304 may be coated in an uncured thermoset, anaerobic, or thermoplastic adhesive to aid in retention of the ferrule on the sleeve/fitting body. In various embodiments, the thermoset or anaerobic adhesives may be cured after the ferrule and sleeve/fitting body are assembled.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A low clearance fluid coupling, the low clearance fluid coupling comprising:
    a sleeve/fitting body;
    a tube, wherein an end of the tube is configured to be inserted within an end of the sleeve/fitting body;
    a ferrule, wherein the ferrule is configured to surround an outer circumference of the tube and is further configured to interface with the sleeve/fitting body; and
    an elastomeric O-ring seal, the elastomeric O-ring seal configured to prevent or reduce liquid from passing through to the ferrule, wherein the ferrule is fitted into a distal end of the sleeve/fitting body positioned between the tube and the sleeve/fitting body and wherein the sleeve/fitting body is either swaged or crimped to the ferrule.

2. The low clearance fluid coupling of claim 1, wherein the tube is comprised of at least one of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP).

3. The low clearance fluid coupling of claim 1, wherein the sleeve/fitting body is comprised of at least one of stainless steel, aluminum, or titanium.

4. The low clearance fluid coupling of claim 1, wherein the ferrule is a snap ferrule and wherein a distal end of the snap ferrule is configured to couple to a proximal end of the sleeve/fitting body.

5. The low clearance fluid coupling of claim 4, wherein the distal end of the snap ferrule comprises at least one of a convex portion or a concave portion, wherein the proximal end of the sleeve/fitting body comprises an opposite of the at least one of the convex portion or the concave portion, and wherein the convex or concave portion of the distal end of the snap ferrule snaps into the concave or convex portion of the proximal end of the sleeve/fitting body.

6. The low clearance fluid coupling of claim 1, wherein the tube comprises a groove on an outside circumference of the tube in which the elastomeric O-ring seal is positioned.

7. The low clearance fluid coupling of claim 1, wherein the tube comprises a bead that is positioned between a tube end of the tube and the ferrule.

8. The low clearance fluid coupling of claim 1, wherein the sleeve/fitting body comprises a groove on an inside circumference of the sleeve/fitting body in which the elastomeric O-ring seal is positioned.

9. The low clearance fluid coupling of claim 1, wherein the ferrule is positioned between the elastomeric O-ring seal and the end of the sleeve/fitting body and wherein the end of the sleeve/fitting body is either swaged or crimped to contain the ferrule within the sleeve/fitting body.

10. An aircraft, the aircraft comprising:
a low clearance fluid coupling, the low clearance fluid coupling comprising:
a sleeve/fitting body;
a tube, wherein an end of the tube is configured to be inserted within an end of the sleeve/fitting body;
a ferrule, wherein the ferrule is configured to surround an outer circumference of the tube and is further configured to interface with the sleeve/fitting body; and
an elastomeric O-ring seal, the elastomeric O-ring seal configured to prevent or reduce liquid from passing through to the ferrule, wherein the ferrule is fitted into a distal end of the sleeve/fitting body positioned between the tube and the sleeve/fitting body and wherein the sleeve/fitting body is either swaged or crimped to the ferrule.

11. The aircraft of claim 10, wherein the tube is comprised of at least one of polyethylene (PE), polypropylene (PP), polyester, polyoxymethylene (POM), polyamide (PA), polyarylene sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP).

12. The aircraft of claim 10, wherein the sleeve/fitting body is comprised of at least one of stainless steel, aluminum, or titanium.

13. The aircraft of claim 10, wherein the ferrule is a snap ferrule and wherein a distal end of the snap ferrule is configured to couple to a proximal end of the sleeve/fitting body.

14. The aircraft of claim 13, wherein the distal end of the snap ferrule comprises at least one of a convex portion or a concave portion, wherein the proximal end of the sleeve/fitting body comprises an opposite of the at least one of the convex portion or the concave portion, and wherein the convex or concave portion of the distal end of the snap ferrule snaps into the concave or convex portion of the proximal end of the sleeve/fitting body.

15. The aircraft of claim 10, wherein the tube comprises a groove on an outside circumference of the tube in which the elastomeric O-ring seal is positioned.

16. The aircraft of claim 10, wherein the tube comprises a bead that is positioned between a tube end of the tube and the ferrule.

17. The aircraft of claim 10, wherein the sleeve/fitting body comprises a groove on an inside circumference of the sleeve/fitting body in which the elastomeric O-ring seal is positioned.

18. The aircraft of claim 10, wherein the ferrule is positioned between the elastomeric O-ring seal and the end of the sleeve/fitting body and wherein the end of the sleeve/fitting body is either swaged or crimped to contain the ferrule within the sleeve/fitting body.

* * * * *